US008354070B2

(12) United States Patent
Park et al.

(10) Patent No.: US 8,354,070 B2
(45) Date of Patent: Jan. 15, 2013

(54) HEAT RECOVERY SYSTEM

(75) Inventors: Choong Yeul Park, Seoul (KR); Hyun Joo Park, Busan (KR)

(73) Assignee: Dongsung Ecore Co. Ltd, Busan (KR)

( * ) Notice: Subject to any disclaimer, the term of this patent is extended or adjusted under 35 U.S.C. 154(b) by 132 days.

(21) Appl. No.: 12/672,123

(22) PCT Filed: Jul. 28, 2009

(86) PCT No.: PCT/CN2009/072958

§ 371 (c)(1), (2), (4) Date: Jul. 12, 2010

(87) PCT Pub. No.: WO2010/130110

PCT Pub. Date: Nov. 18, 2010

(65) Prior Publication Data

US 2011/0064623 A1 Mar. 17, 2011

(30) Foreign Application Priority Data

May 12, 2009 (HK) .................................... 09104351

(51) Int. Cl.

*B01J 8/08* (2006.01)
*B01J 19/00* (2006.01)
*C10B 7/00* (2006.01)

(52) U.S. Cl. .......... 422/233; 422/198; 202/98; 202/117; 202/106

(58) Field of Classification Search .................. 422/233, 422/198; 202/98, 117, 106

See application file for complete search history.

(56) References Cited

U.S. PATENT DOCUMENTS

| | | | | |
|---|---|---|---|---|
| 5,369,947 | A * | 12/1994 | Dummersdorf et al. | 60/781 |
| 6,149,773 | A * | 11/2000 | Grimshaw et al. | 201/21 |
| 6,244,198 | B1 * | 6/2001 | Suominen | 110/342 |
| 6,758,150 | B2 * | 7/2004 | Ballantine et al. | 110/229 |
| 7,101,463 | B1 | 9/2006 | Weinecke et al. | |

FOREIGN PATENT DOCUMENTS

| | | |
|---|---|---|
| CN | 1320147 | 12/2001 |
| EP | 1504077 | 8/2006 |
| WO | 2007/024687 | 3/2007 |
| WO | 2007/142441 | 12/2007 |
| WO | 2007/145400 | 12/2007 |

* cited by examiner

OTHER PUBLICATIONS

C.C. Lee, "Wet and Dry Scrubbers for Emission Control", Handbook of Environmental Engineering Calculations, McGraw-Hill, 2007, Chapter 3.3, p. 3.223, retrieved from www.knovel.com.* International Search Report for corresponding patent application No. PCT/CN2009/072958 dated Jul. 28, 2009.

*Primary Examiner* — Walter D Griffin
*Assistant Examiner* — Lessanework Seifu
(74) *Attorney, Agent, or Firm* — Renner, Otto, Boisselle & Sklar, LLP

(57) ABSTRACT

A moving disk type tube reactor for continuously pyrolyzing waste tire chips and preventing accumulation of remainders produced by pyrolysis, includes: a heating tube having at the ends thereof inflow and outflow ports for allowing high-temperature gas to flow; a first transfer tube penetrating the heating tube and having an input port for inputting the chips at one end thereof; a second transfer tube disposed parallel to the first transfer tube; a driving part disposed at the other end of the first and second transfer tubes, having a driving sprocket driven by a driving motor, and having a discharge port discharging oil vapor; a driven part disposed at one end of the transfer tubes, having a driven sprocket and a discharge port discharging pyrolyzed carbon black to the outside; a chain penetrating the transfer tubes and wound on the sprockets to circulate; and a plurality of disks along the chain.

16 Claims, 10 Drawing Sheets

C - C'

HEAT RECOVERY SYSTEM

TECHNICAL FIELD

The present invention relates to a moving disk type tube reactor and a heat recovery system, and more particularly, to a moving disk type tube reactor that can continuously pyrolyze waste tire chips and prevent remainders produced by pyrolysis from being accumulated. The invention also relates to a heat recovery system that can use as an energy source or reuse for other applications high-temperature gas used at the time of operating a moving disk type tube reactor and non-condensed oil vapor, oil, and carbon black produced by pyrolyzing waste tire chips.

BACKGROUND ART

With the deepening in lack of energy sources, studies for recovering energy from used products have been made. The most representative energy recoverable product is waste tires. When the waste tires are pyrolyzed, products of oil of 50 wt %, gas of 10 wt %, carbon of 30 wt %, and iron core of 10 wt % are generated, which have a great effective value as an energy source and a recycling resource.

In general, energy recovery techniques using waste tires are classified into a dry distillation incinerating scheme and a pyrolysis scheme.

The dry distillation incinerating scheme has a problem that a mass process is difficult, the initial cost of equipment is great, and secondary pollutants are produced by the incineration.

In the pyrolysis scheme, it is ideal that the pyrolytic reaction temperature in a reactor is in the range of 380° C. to 400° C., but much time is taken to reach a proper reaction temperature at the time of pyrolyzing the waste tires in the reactor. Particularly, the temperature maintenance is not effective to deteriorate the quality of oil. In addition, when remainders produced in the course of pyrolysis are secured to inner walls of the reactor or a transfer mechanism to generate scales, the thermal conductivity of the reactor may be deteriorated, thereby causing a critical defect in operation of the transfer mechanism in the reactor.

Conclusively, the development of a pyrolysis reactor that can maintain the optimal reaction temperature in the reactor and minimize the formation of scales of remainders is very important in pyrolytic oiling equipment using waste tires, but a pyrolysis reactor having solved the above-mentioned problems does not come to the market yet.

DISCLOSURE OF THE INVENTION

Technical Goal

The invention is contrived to solve the above-mentioned problems. A technical goal of the invention is to provide a moving disk type tube reactor that can continuously pyrolyze waste tires and prevent remainders produced by pyrolysis from being accumulated.

Another technical goal of the invention is to provide a heat recovery system that can use as an energy source or reuse for other applications high-temperature gas used at the time of operating a moving disk type tube reactor and non-condensed oil vapor, oil and carbon black produced by pyrolyzing waste tire chips.

Technical Solution

According to an aspect of the invention, there is provided a moving disk type tube reactor including: a heating tube in which an inflow port and an outflow port for allowing high-temperature gas to flow in and out are formed at both ends thereof, respectively; a first transfer tube penetrating the heating tube and having an input port for inputting waste tire chips at one end thereof; a second transfer tube disposed parallel to the first transfer tube; a driving part disposed at the other end of the first and second transfer tubes, having a driving sprocket and a driving motor for driving the driving sprocket therein, and having a discharge port discharging oil vapor formed therein; a driven part disposed at one end of the first and second transfer tube, having a driven sprocket formed therein, and having a discharge port discharging pyrolyzed carbon black to the outside; a chain disposed to penetrate the first and second transfer tube and wound on the driving and driven sprockets to circulate; and a plurality of disks disposed along the chain.

According to another aspect of the invention, there is provided a heat recovery system including: a moving disk type tube reactor; a heat recovering and steam generating unit recovering heat from high-temperature gas discharged from the moving disk type tube reactor and generating steam using the recovered thermal energy; a steam turbine being operated by the steam generated by the heat recovering and steam generating unit; and a generator connected to the steam turbine to generate electrical energy.

Advantageous Effect

The moving disk type tube reactor according to the invention can continuously pyrolyze waste tires by transferring waste tire chips input to the transfer tubes using the chain and the disks and prevent remainders produced by pyrolysis from being accumulated (coking phenomenon).

The heat recovery system according to the invention can use as an energy source or reuse for other applications high-temperature gas used at the time of operating a moving disk type tube reactor and non-condensed oil vapor, oil, and carbon black produced by pyrolyzing waste tire chips.

BEST MODE FOR CARRYING OUT THE INVENTION

Embodiments of the invention will be described in detail with reference to the accompanying drawings.

Figure 1:
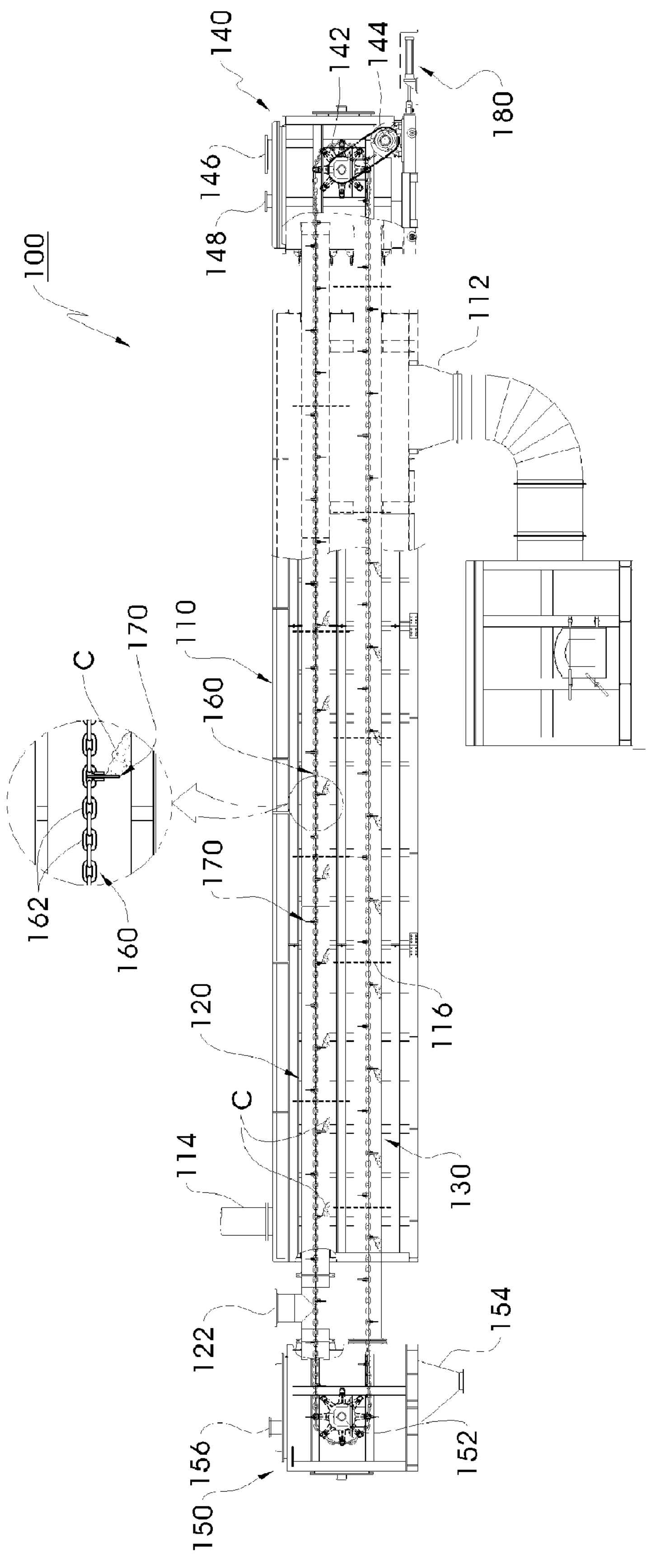
FIG. 1 is a front view illustrating a moving disk type tube reactor according to an embodiment of the invention.
Figure 2:
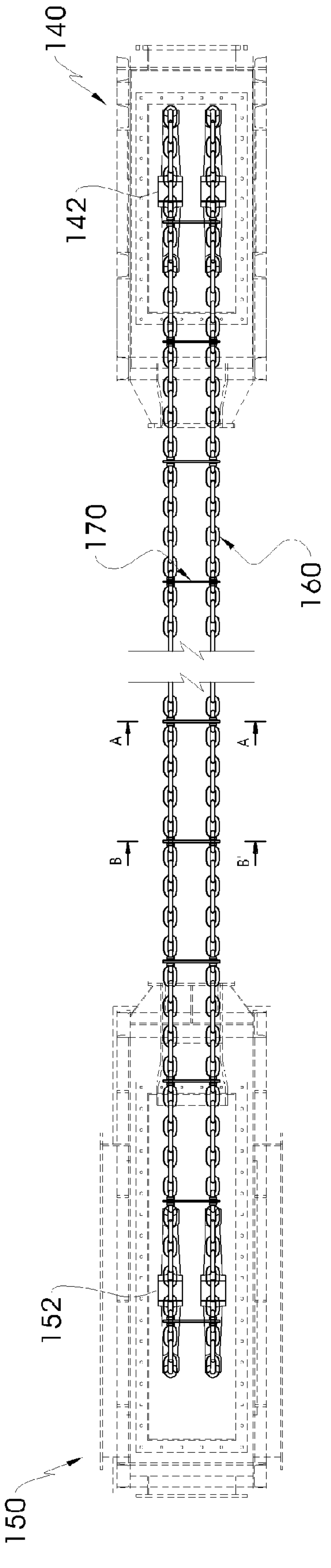
FIG. 2 is a plan view of FIG. 1.
Figure 3:
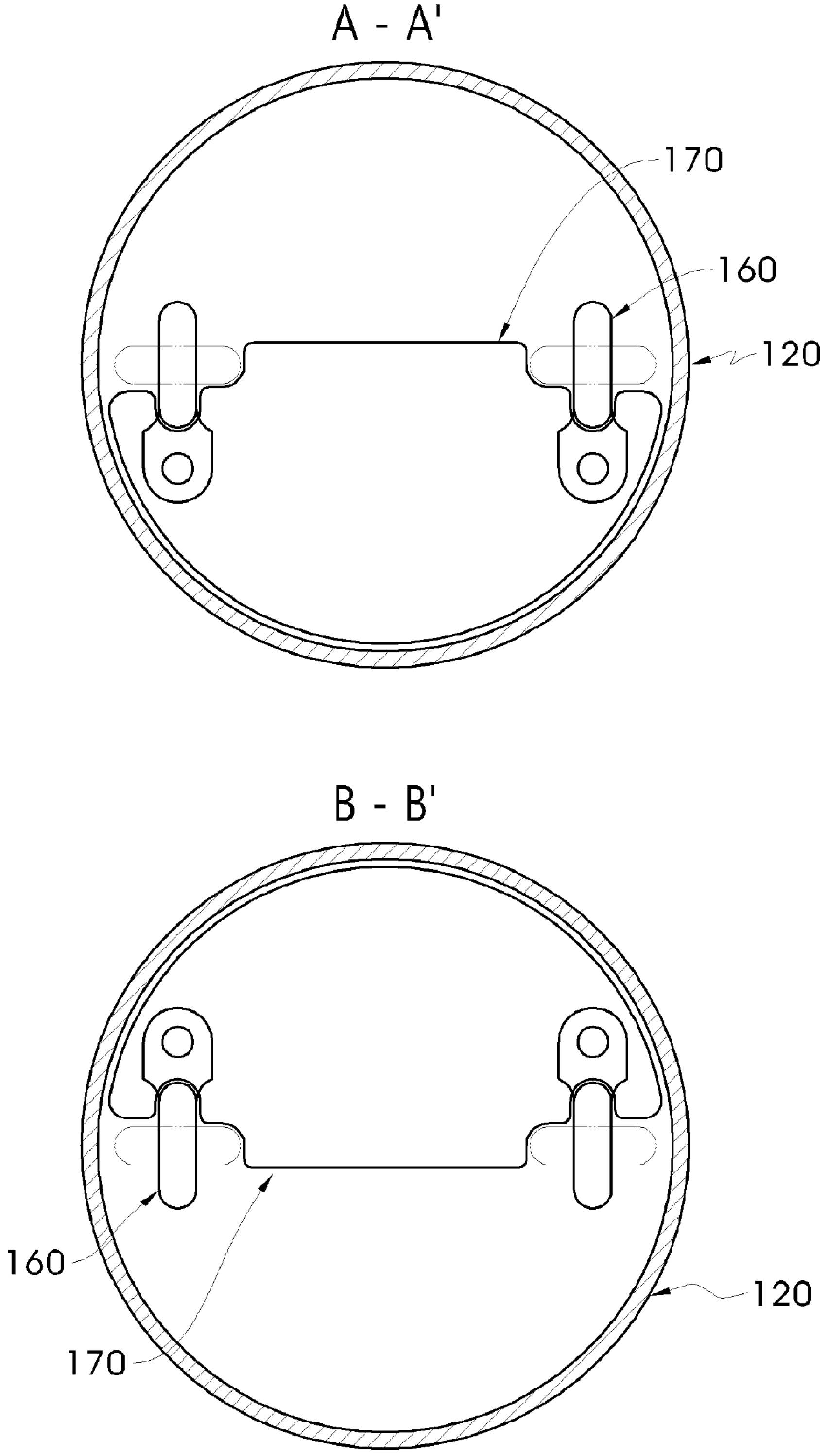
FIG. 3 shows sectional views taken along lines A-A' and B-B' of FIG. 2.
Figure 4:
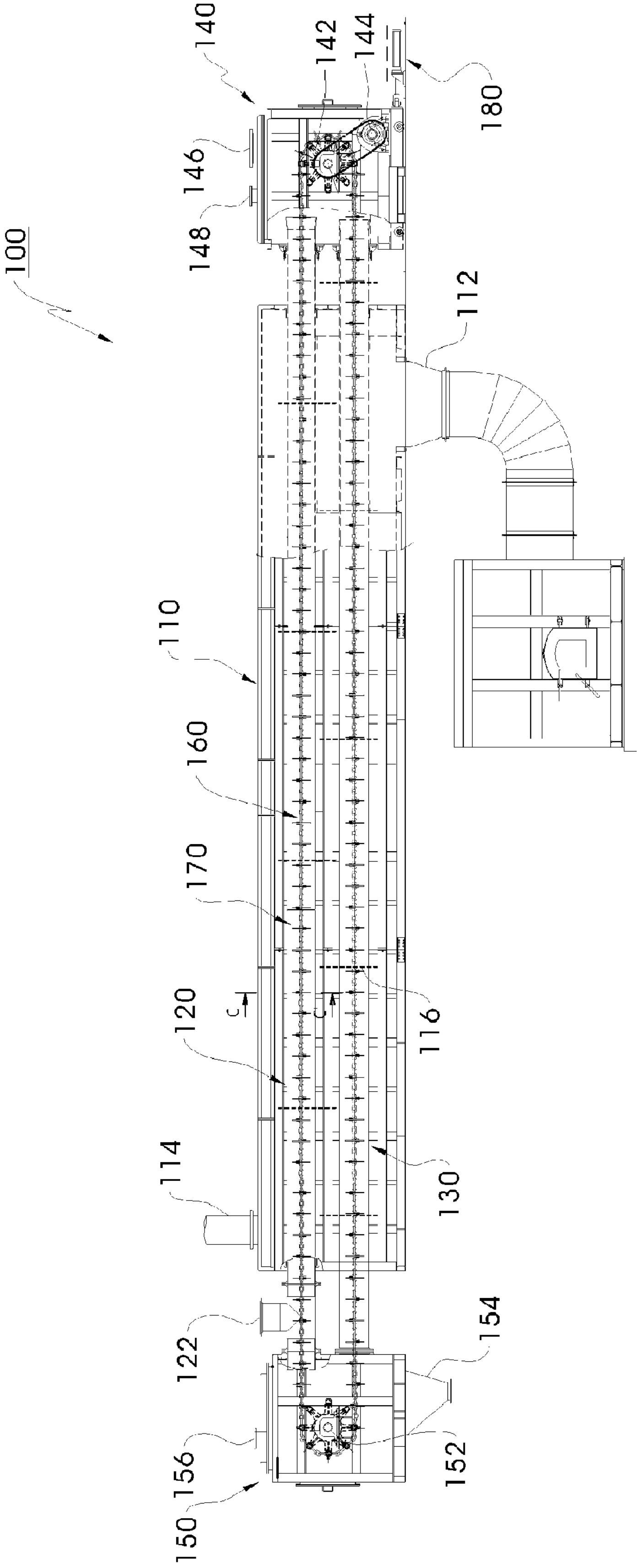
FIG. 4 is a front view illustrating a moving disk type tube reactor according to another embodiment of the invention.
Figure 5:
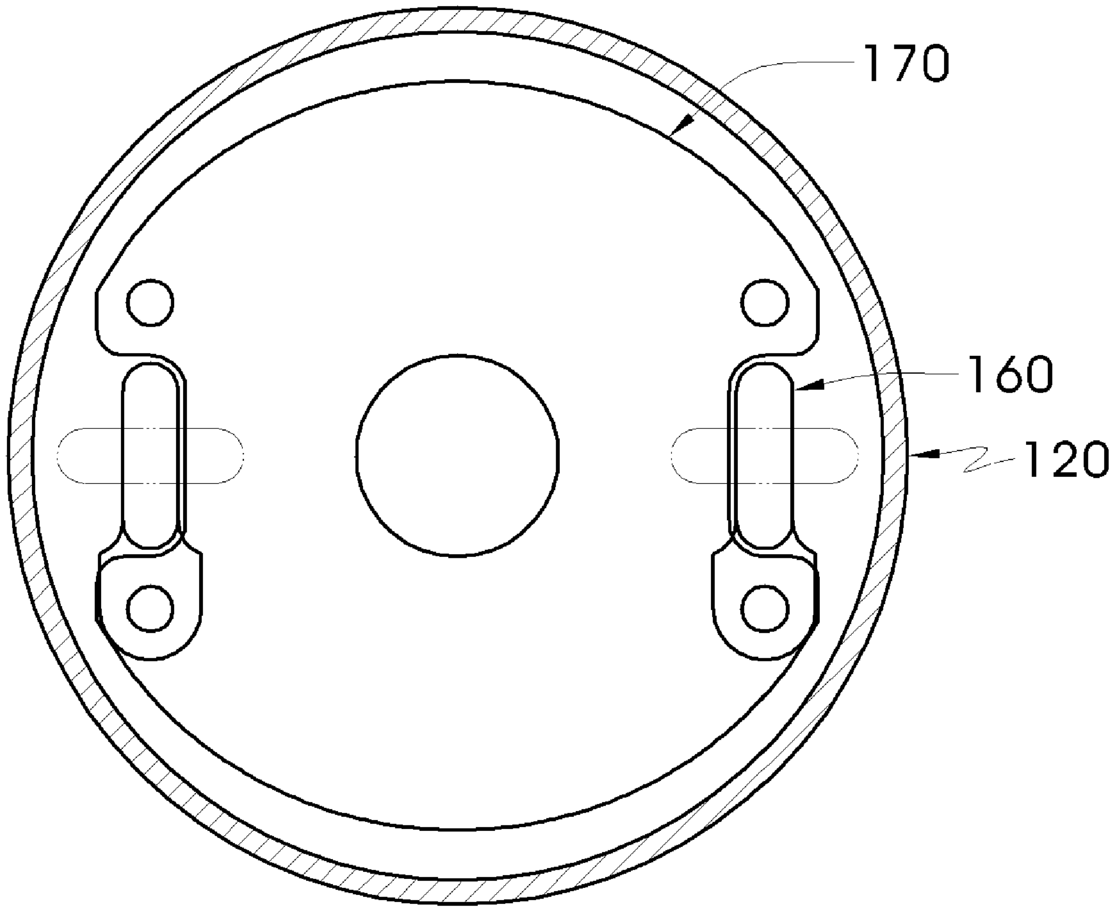
FIG. 5 is a sectional view taken along line C-C' of FIG. 4.
Figure 6:
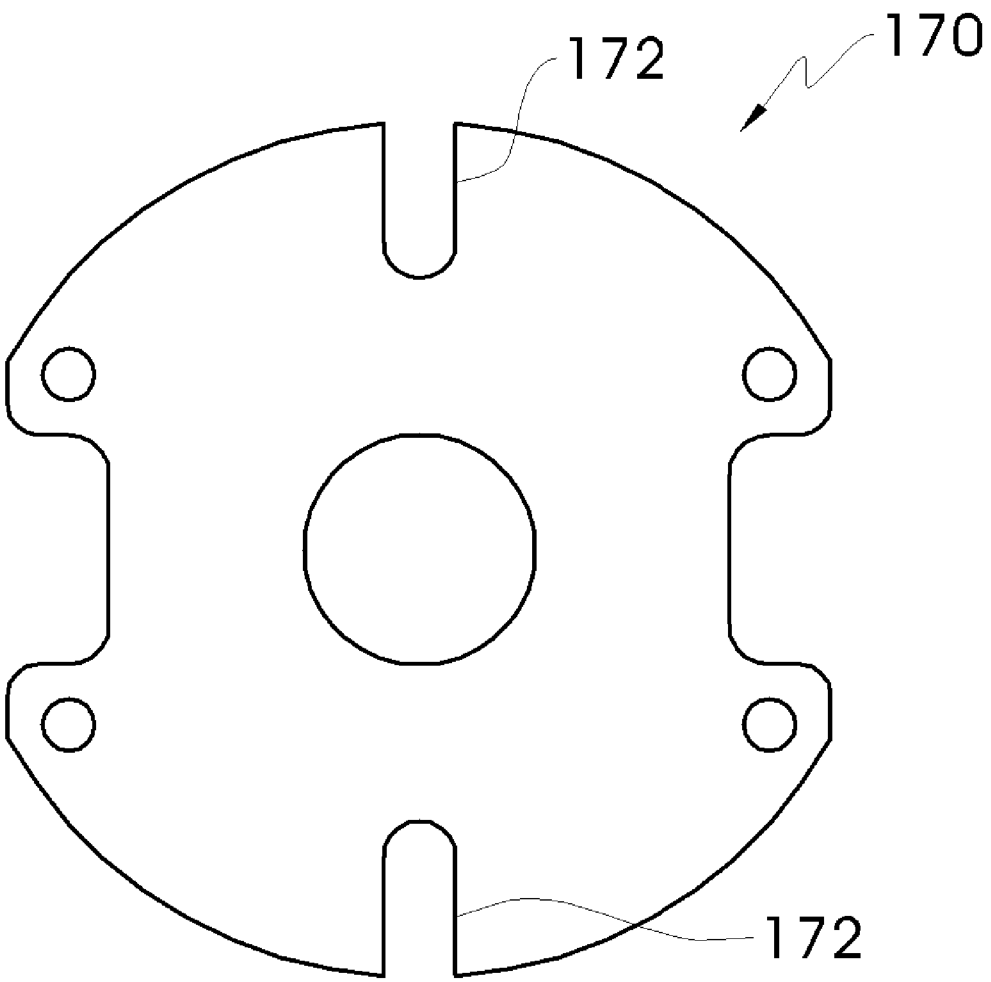
FIG. 6 is a diagram illustrating another example of a disk of the moving disk type tube reactor.

FIG. 1 is a front view illustrating a moving disk type tube reactor of a heat recovery system according to an embodiment of the invention. FIG. 2 is a plan view of FIG. 1. FIG. 3 shows sectional views taken along lines A-A' and B-B' of FIG. 2. FIG. 4 is a front view illustrating a moving disk type tube reactor according to another embodiment of the invention. FIG. 5 is a sectional view taken along line C-C' of FIG. 4. FIG. 6 is a diagram illustrating another example of a disk of the moving disk type tube reactor.

As shown in FIGS. 1 to 3, a moving disk type tube reactor 100 according to an embodiment of the invention includes a heating tube 110, first and second transfer tubes 120 and 130 penetrating the heating tube 110, a driving part 140 and a driven part 150 disposed at both ends of the first and second transfer tubes 120 and 130, respectively, and a chain 160 and a disk 170 driven by the driving part 140 and the driven part 150 to circulate along the first and second transfer tubes 120 and 130.

The above-mentioned elements 110 to 170 will be described in more details.

First, the heating tube 110 has a rectangular shape of which the inside is closely enclosed and an inflow port 112 and an outflow port 114 for allowing high-temperature gas to flow in and out are formed at both ends thereof. Plural baffles 116 guiding the flow of gas (high-temperature gas) and adjusting a staying time thereof are disposed in the heating tube 110.

Here, as shown in FIG. 1, the plural baffles 116 are alternately disposed to be opposed to each other and allow the high-temperature gas flowing through the inflow port 112 to stay in the heating tube 110 for a long time. Accordingly, it is possible to heat the heating tube 110 for a short time and to uniformly heat the inside of the heating tube 110.

The first and second transfer tubes 120 and 130 have a cylindrical pipe shape of which both ends are opened so as to transfer waste tire chips C with the movement of the chain 160 and the disks 170. The first and second transfer tubes 120 and 130 are vertically separated from each other by a predetermined distance to be parallel to each other and an input port 122 for inputting the waste tire chips C is particularly formed at one end of the first transfer tube 120.

The driving part 140 serves to drive the chain 160 and the disks 170 and includes a driving sprocket 142 on which the chain 160 is wound and a driving motor 144 driving the driving sprocket 142. The driven part 150 serves to drive the chain 160 and the disk 170 in cooperation with the driving part 140 and includes a driven sprocket 152 on which the chain 160 is wound.

The driving part 140 is provided with a discharge port 146 for discharging oil vapor generated at the time of pyrolyzing the waste tire chips C and the driven part 150 is provided with a discharge port 154 for discharging pyrolyzed carbon black generated at the time of pyrolyzing the waste tire chips C. The driving part 140 and the driven part 150 are provided with safety valves 148 and 156 for preventing the inner pressure from increasing with gas generated at the time of pyrolyzing the waste tire chips C.

On the other hand, the driving part 140 is disposed movable and an actuator 180 is disposed on one side thereof so as to move the driving part 140 in the longitudinal direction of the first and second transfer tubes 120 and 130 depending on the internal temperature of the heating tube 110. This serves to prevent the chain 160 from departing from its path. Specifically, the chain 160 is prevented from departing from the driving and driven sprockets 142 and 152 due to its thermal expansion by the high-temperature gas supplied to the heating tube 110.

The chain 160 and the disks 170 are driven by the driving part 140 and the driven part 150 as described above and serves to circulate along the first and second transfer tubes 120 and 130 to transfer the waste tire chips C. The chain 160 is a known-shape chain in which plural rings 162 are longitudinally connected. The disks 170 are disposed at the same interval along the chain 160.

The disks 170 have a semi-circular shape as shown in FIG. 3, where a shape protruding upward from the chain 160 and a shape protruding downward from the chain 160 may be alternately arranged. In addition, as shown in FIGS. 5 and 6, the disks 170 may have a circular shape including an elliptical shape and may be disposed at the same interval along the chain 160.

On the other hand, the outer diameter of the disks 170 having the above-mentioned shapes is smaller than the inner diameter of the first and second transfer tubes 120 and 130. That is, a predetermined gap is disposed between the disks 170 and the first and second transfer tubes 120 and 130. This serves to prevent the disks 170 from interfering with the first and second transfer tubes 120 and 130 due to its thermal expansion. Here, the gap can vary depending on the material of the disks 170 and is preferably in the range of about 1 to 2 mm.

In another method of preventing the disks 170 from interfering with the first and second transfer tubes 120 and 130 due to its thermal expansion, as shown in FIG. 6, a slit 172 having a predetermined width is formed in one or both of the upper and lower portions of the disks 170. Accordingly, when the disks 170 thermally expand, the width of the slit 172 decreases to prevent the interference with the first and second transfer tubes 120 and 130. Here, it is preferable that the width of the slit 172 is in the range of about 1 to 2 mm.

The pyrolysis of the waste tire chips C using the moving disk type tube reactor 100 having the above-mentioned configuration will be described now.

When the waste tire chips C are input through the input port 122 of the first transfer tube 120, the waste tire chips are transferred to the driving part 140 along the first transfer tube 120 by the chain 160 and the disks 170 driven by the driving part 140.

The transferred waste tire chips C are ejected into the driving part 140, are input to the second transfer tube 130 by the chain 160 and the disks 170 circulating, and are then transferred to the driven part 150 along the second transfer tube 130.

In the course of transferring the waste tire chips C along the first and second transfer tubes 120 and 130, high-temperature gas flows in the heating tube 110 and the heating tube 110 is heated indirectly by the high-temperature gas to pyrolyze the waste tire chips C. At this time, oil vapor and pyrolyzed carbon black are generated from the waste tire chips C, the generated oil vapor is discharged through the discharge port 146 of the driving part 140, and the pyrolyzed carbon black is discharged through the discharge port 154 of the driven part 150.

Conclusively, the moving disk type tube reactor 100 according to the invention can continuously pyrolyze the waste tire chips C by transferring the waste tire chips input to the first and second transfer tubes 120 and 130 using the chain 160 and the disks 170 and prevent remainders produced by pyrolysis from being accumulated in the first and second transfer tubes 120 and 130 (coking phenomenon).

Figure 7:
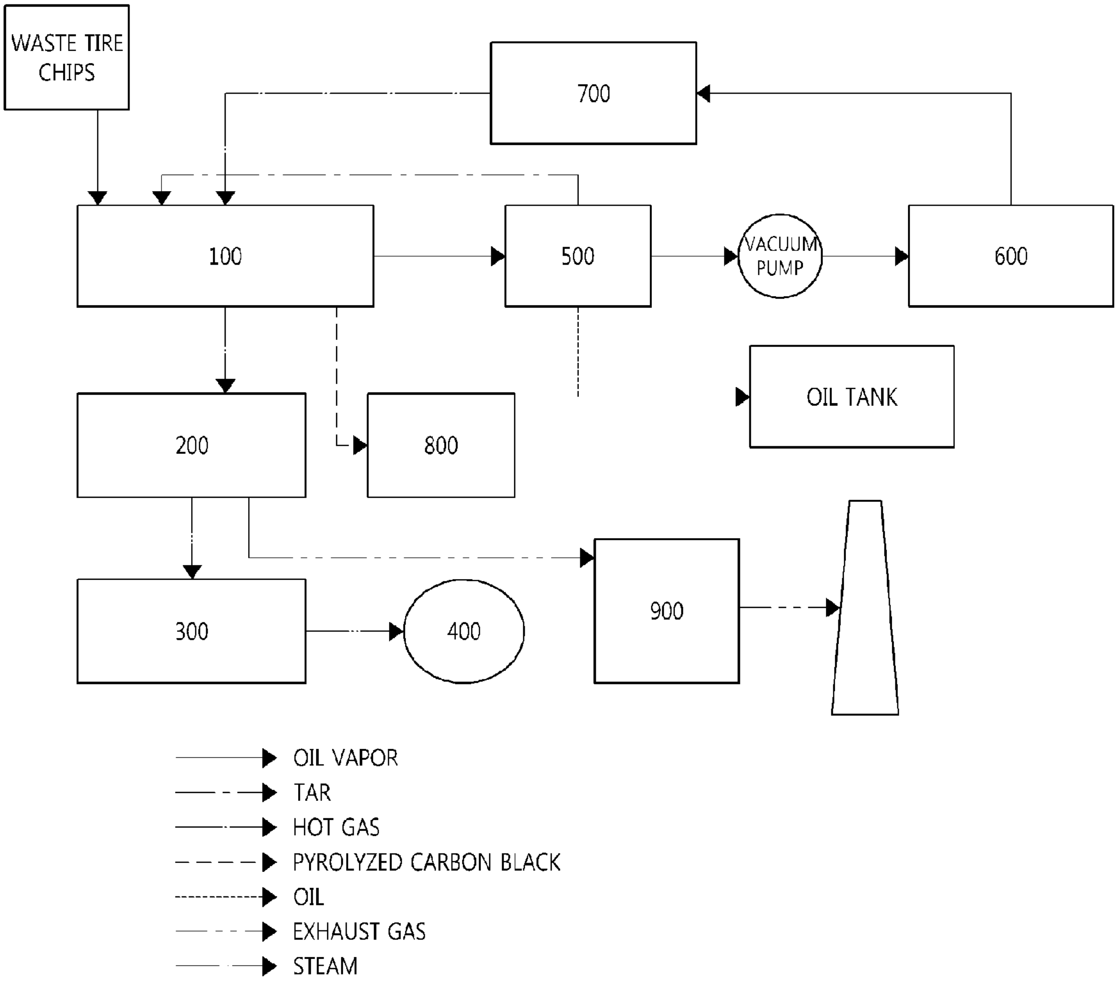
FIG. 7 is a block diagram illustrating a heat recovery system according to a first embodiment of the invention.

FIG. 7 is a block diagram illustrating a heat recovery system according to a first embodiment of the invention.

As shown in FIG. 7, the heat recovery system according to the first embodiment of the invention includes a moving disk type tube reactor 100 recovering oil and pyrolyzed carbon black using waste tire chips, a heat recovering and steam generating unit 200 recovering heat from high-temperature gas discharged from the moving disk type tube reactor 100 and generating steam using the recovered thermal energy, a steam turbine 300 operating with the steam generated by the heat recovering and steam generating unit 200, and a generator 400 connected to the steam turbine 300 to generate electrical energy.

The heat recovery system having the above-mentioned configuration supplies the high-temperature gas discharged from the moving disk type tube reactor 100 to the heat recovering and steam generating unit 200 to recover heat and generates the steam using the recovered thermal energy. Then, the heat recovery system generates electricity by allowing the steam turbine 300 to operate using the generated steam and driving the generator 400.

The heat recovery system further includes an oil recovering unit 500, an non-condensed oil vapor recovering unit 600, a hot gas generator (HGG) 700, a pyrolyzed carbon black recovering unit 800, and a wet scrubber 900. These constituent elements are also applied to known heat recovery systems and are thus mentioned in brief.

The oil recovering unit 500 serves to recover oil using the oil vapor generated by the moving disk type tube reactor 100 and includes a direct contact type quencher and an indirect contact type condenser.

The non-condensed oil vapor generated by the oil recovering unit 500 is recovered by the non-condensed oil vapor recovering unit 600. The recovered non-condensed oil vapor is supplied to the hot gas generator (HGG) 700 to generate hot gas and the generated high-temperature gas is supplied to the moving disk type tube reactor 100.

The pyrolyzed carbon black recovering unit 800 recovers the pyrolyzed carbon black generated by the moving disk type tube reactor 100. The wet scrubber 900 filters exhaust gas generated from the heat recovering and steam generating unit 200 and discharges the filtered exhaust gas to the outside.

Figure 8:
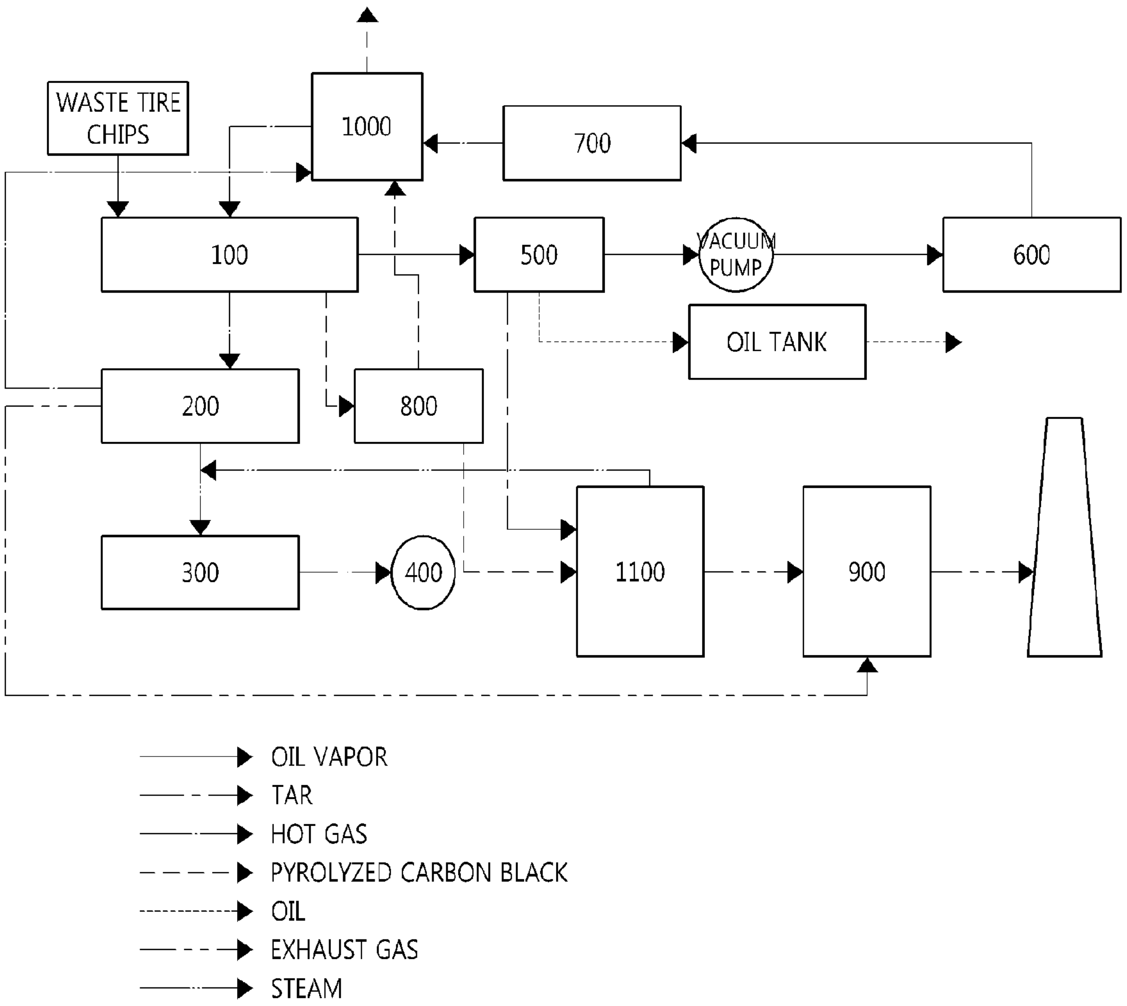
FIG. 8 is a block diagram illustrating a heat recovery system according to a second embodiment of the invention.

FIG. 8 is a block diagram illustrating a heat recovery system according to a second embodiment of the invention. In describing the heat recovery system according to the second embodiment of the invention with reference to FIG. 8, the same constituent elements as described in the first embodiment will not be described.

The heat recovery system according to the second embodiment of the invention includes a moving disk type tube reactor 100, a heat recovering and steam generating unit 200, a steam turbine 300, a generator 400, an oil recovering unit 500, a non-condensed oil vapor recovering unit 600, a hot gas generator (HGG) 700, a carbon black recovering unit 800, a wet scrubber 900, an activation furnace 1000, and a fluidized-bed boiler 1100.

The activation furnace 1000 serves to refine some of the pyrolyzed carbon black recovered by the carbon black recovering unit 800 into activated carbon using the hot gas generated by the hot gas generator (HGG) 700. The fluidized-bed boiler 1100 serves to generate steam using the other of the pyrolyzed carbon black recovered by the carbon black recovering unit 800 and tar generated by the oil recovering unit 500 and to supply the generated steam to the steam turbine 300.

The heat recovery system having the above-mentioned configuration refines some of the pyrolyzed carbon black recovered by the carbon black recovering unit 800 into the activated carbon using the hot gas generated by the hot gas generator (HGG) 700. The refinement of the activated carbon can be performed by heating the pyrolyzed carbon black to about 1,000° C. in the activation furnace 1000.

The hot gas (about 900° C.) used in refining the pyrolyzed carbon black into activated carbon is supplied to the moving disk type tube reactor 100 to heat the moving disk type tube reactor 100 and then is supplied to the heat recovering and steam generating unit 200. The heat recovering and steam generating unit 200 recovers heat from the hot gas (about 600° C.), generates steam using the recovered thermal energy, and generates electricity by activating the steam turbine 300 and the generator 400 using the generated steam.

On the other hand, the other of the pyrolyzed carbon black not refined into activated carbon is used as a fuel of the fluidized-bed boiler 1100. The fluidized-bed boiler 1100 generates the steam using tar generated from the oil recovering unit 500 as the fuel in addition to the pyrolyzed carbon black and supplies the generated steam to the steam turbine 300.

Figure 9:
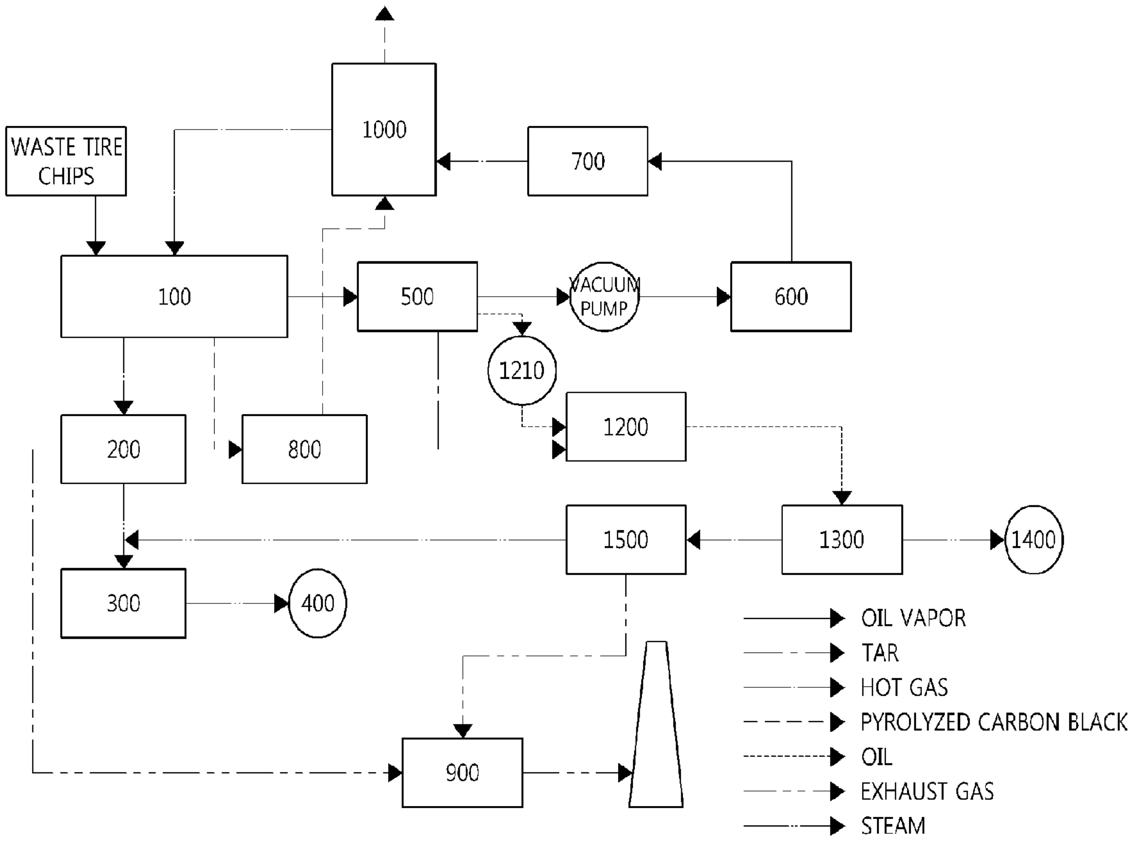
FIG. 9 is a block diagram illustrating a heat recovery system according to a third embodiment of the invention.

FIG. 9 is a block diagram illustrating a heat recovery system according to a third embodiment of the invention. In describing the heat recovery system according to the third embodiment of the invention with reference to FIG. 9, the same constituent elements as described in the first and second embodiments will not be described.

The heat recovery system according to the third embodiment of the invention includes a moving disk type tube reactor 100, a first heat recovering and steam generating unit 200, a steam turbine 300, a generator 400, an oil recovering unit 500, a non-condensed oil vapor recovering unit 600, a hot gas generator (HGG) 700, a carbon black recovering unit 800, a wet scrubber 900, an activation furnace 1000, a gas generating unit 1200, a gas turbine 1300, a generator 1400, and a second heat recovering and steam generating unit 1500.

The gas generating unit 1200 serves to generate synthetic gas using the oil recovered by the oil recovering unit 500. The gas turbine 1300 operates with the synthetic gas generated by the gas generating unit 1200. The generator 1400 is connected to the gas turbine 1300 to generate electrical energy. The second heat recovering and steam generating unit 1500 serves to recover heat from the exhaust gas generated from the gas turbine 1300 and to generate steam using the recovered thermal energy.

The heat recovery system having the above-mentioned configuration generates the synthetic gas using the oil recovered by the oil recovering unit 500. The generation of the synthetic gas can be performed in the gas generating unit 1200 by allowing a booster pump 1210 to compress the gas with a high pressure. The gas turbine 1300 and the generator 1400 are driven using the generated synthetic gas to generate electricity.

On the other hand, the exhaust gas generated from the gas turbine 1300 is supplied to the second heat recovering and steam generating unit 1500. The second heat recovering and steam generating unit 1500 recovers the heat from the exhaust gas and generates steam using the recovered thermal energy. The steam turbine 300 and the generator 400 are activated to generate electricity.

Figure 10:
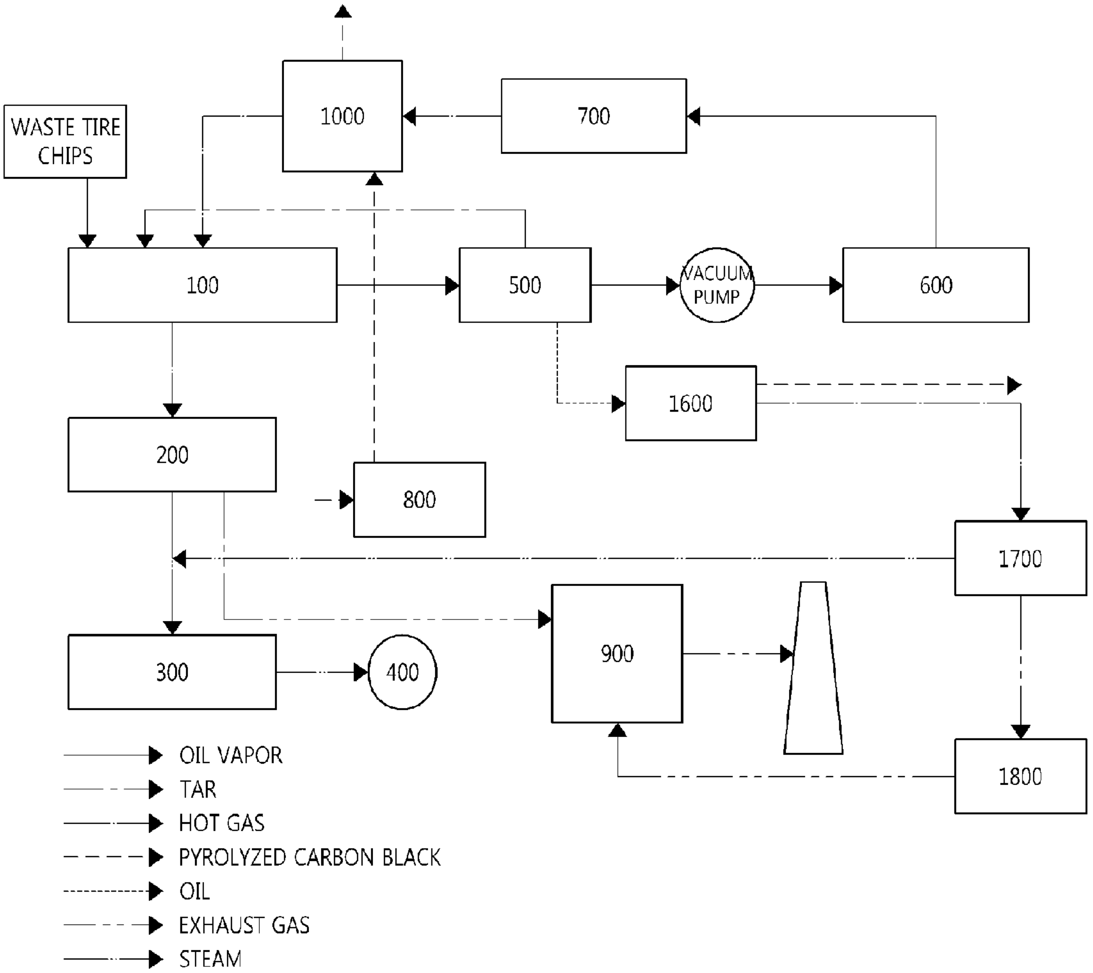
FIG. 10 is a block diagram illustrating a heat recovery system according to a fourth embodiment of the invention.

FIG. 10 is a block diagram illustrating a heat recovery system according to a fourth embodiment of the invention. In describing the heat recovery system according to the fourth embodiment of the invention with reference to FIG. 10, the same constituent elements as described in the first to third embodiments will not be described.

The heat recovery system according to the fourth embodiment of the invention includes a moving disk type tube reactor 100, a first heat recovering and steam generating unit 200, a steam turbine 300, a generator 400, an oil recovering unit 500, a non-condensed oil vapor recovering unit 600, a hot gas generator (HGG) 700, a carbon black recovering unit 800, a wet scrubber 900, an activation furnace 1000, a heating furnace 1600, a third heat recovering and steam generating unit 1700, and a filter 1800.

The heating furnace 1600 serves to heat the oil recovered by the oil recovering unit 500 and to generate the pyrolyzed carbon black. The third heat recovering and steam generating unit 1700 serves to recover heat from the high-temperature gas used in generating the pyrolyzed carbon black in the heating furnace 1600 and to generate steam using the recovered thermal energy. The filter 1800 serves to filter exhaust gas generated from the third heat recovering and steam generating unit 1700.

The heat recovery system having the above-mentioned configuration heats the oil recovered by the oil recovering unit 500 to generate the pyrolyzed carbon black by the use of the heating furnace 1600, recovers heat from the high-temperature gas used in generating the pyrolyzed carbon black in the heating furnace 1600 by the use of the third heat recovering and steam generating unit 1700, and generates the steam using the recovered thermal energy. The steam turbine 300 and the generator 400 are driven by the generated steam to generate electricity.

Although the moving disk type tube reactor and the heat recovery system according to the exemplary embodiments of the invention has been described with the accompanying drawings, it is only an example. It will be understood well by technician in this area that the invention can be modified in various forms based on this invention.

The invention claimed is:

1. A moving disk type tube reactor comprising:

a heating tube having an inflow port and an outflow port for allowing high-temperature gas to flow in and out of the heating tube for flow along the heating tube;

a first transfer tube extending through the heating tube and having an input port for inputting waste tire chips at one end thereof;

a second transfer tube extending through the heating tube and disposed parallel to the first transfer tube;

a driving part disposed at a first end of the first and second transfer tubes, the driving part having a driving sprocket and a driving motor for driving the driving sprocket;

a discharge port for discharging oil vapor formed within the reactor;

a driven part disposed at a second end of the first and second transfer tubes, the driven part having a driven sprocket;

a discharge port for discharging pyrolyzed carbon black from the reactor to the outside;

a chain extending through the first and second transfer tubes and wound on the driving and driven sprockets to circulate; and a plurality of disks disposed along the chain; and wherein the driving part and driven part are movable relative to one another in the longitudinal direction of the first and second transfer tubes.

2. The moving disk type tube reactor according to claim 1, further comprising an actuator for moving the driving part in the longitudinal direction of the first and second transfer tubes depending on the inner temperature of the heating tube.

3. The moving disk type tube reactor according to claim 1, wherein the plurality of disks have a semi-circular shape and a shape protruding upward from the chain and a shape protruding downward from the chain alternately.

4. The moving disk type tube reactor according to claim 1, wherein the plurality of disks have a circular shape including an elliptical shape.

5. The moving disk type tube reactor according to claim 1, wherein a gap is disposed between the outer circumferences of the disks and the inner circumferences of the first and second transfer tubes.

6. The moving disk type tube reactor according to claim 5, wherein at least one slit is formed in the circumferences of the disks.

7. The moving disk type tube reactor according to claim 6, wherein a plurality of baffles are disposed in the heating tube and the plurality of baffles are alternately disposed to be opposed to each other.

8. The moving disk type tube reactor according to claim 7, wherein a safety valve that is automatically opened and closed depending on the inner pressure is disposed in at least one of the driving part and the driven part.

9. A heat recovery system comprising:

a moving disk type tube reactor according to claim 1;

a heat recovering and steam generating unit recovering heat from high-temperature gas discharged from the moving disk type tube reactor and generating steam using the recovered thermal energy;

a steam turbine being operated by the steam generated by the heat recovering and steam generating unit; and a generator connected to the steam turbine to generate electrical energy.

10. The heat recovery system according to claim 9, further comprising:

an oil recovering unit recovering oil by the use of oil vapor generated by the moving disk type tube reactor;

a non-condensed oil vapor recovering unit recovering non-condensed oil vapor generated by the oil recovering unit;

a hot gas generator (HGG) generating hot gas using the non-condensed oil vapor recovered by the non-condensed oil vapor recovering unit and supplying the generated hot gas to the moving disk type tube reactor; and a pyrolyzed carbon black recovering unit recovering pyrolyzed carbon black generated by the moving disk type tube reactor.

11. The heat recovery system according to claim 10, further comprising a wet scrubber filtering exhaust gas generated from the heat recovering and steam generating unit and discharging the filtered exhaust gas to the outside.

12. The heat recovery system according to claim 11, further comprising:

an activation furnace refining a part of the pyrolyzed carbon black recovered by the carbon black recovering unit into activated carbon using the hot gas generated by the hot gas generator (HGG); and a fluidized-bed boiler generating steam using the other of the pyrolyzed carbon black recovered by the carbon black recovering unit and tar generated by the oil recovering unit and supplying the generated steam to the steam turbine.

13. The heat recovery system according to claim 11, further comprising:

an activation furnace refining the pyrolyzed carbon black recovered by the carbon black recovering unit into activated carbon using the hot gas generated by the hot gas generator (HGG);

a gas generating unit generating synthesized gas using the oil recovered by the oil recovering unit;

a gas turbine being operated by the synthesized gas generated by the gas generating unit; and a generator connected to the gas turbine to generate electrical energy.

14. The heat recovery system according to claim 13, further comprising a second heat recovering and steam generating unit recovering heat from the exhaust gas generated after the gas turbine is operated and generating steam using the recovered thermal energy.

15. The heat recovery system according to claim 11, further comprising:

an activation furnace refining the pyrolyzed carbon black recovered by the carbon black recovering unit into activated carbon using the hot gas generated by the hot gas generator (HGG);

a heating furnace heating the oil recovered by the oil recovering unit to generate the pyrolyzed carbon black;

a third heat recovering and steam generating unit recovering heat from the high-temperature gas used at the time of allowing the heating furnace to generate the pyrolyzed carbon black and generating steam using the recovered thermal energy; and a filter filtering the exhaust gas generated by the second heat recovering and steam generating unit.

16. The heat recovery system according to claim 15, wherein the oil recovering unit includes a direct-contact type quencher and an indirect-contact type condenser.

* * * * *

UNITED STATES PATENT AND TRADEMARK OFFICE

CERTIFICATE OF CORRECTION

PATENT NO. : 8,354,070 B2
APPLICATION NO. : 12/672123
DATED : January 15, 2013
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
First Day of September, 2015

Michelle K. Lee
*Director of the United States Patent and Trademark Office*